Figure 1:
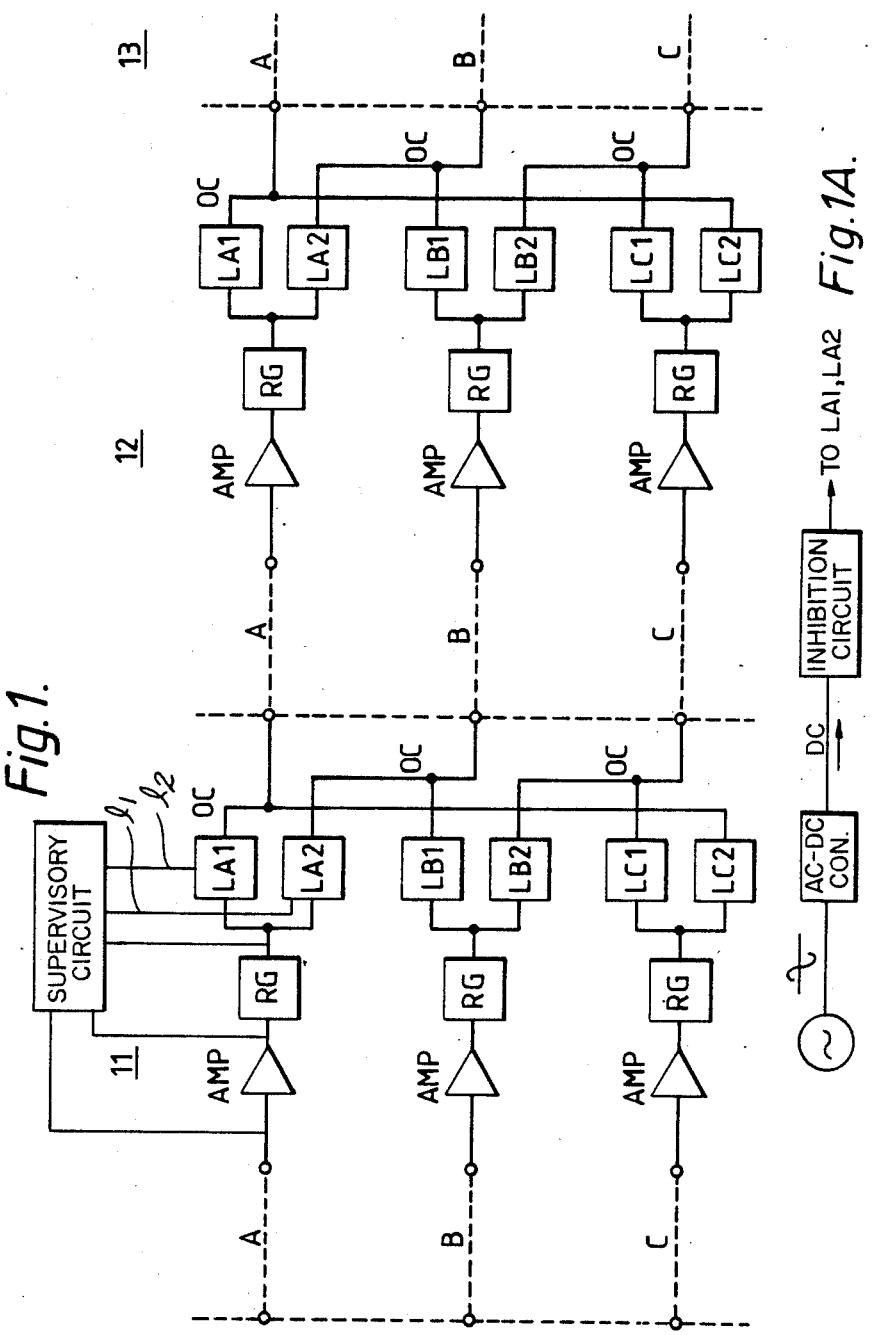

United States Patent [19]

Oswald

[11] Patent Number: 4,696,060

[45] Date of Patent: Sep. 22, 1987

[54] OPTICAL TRANSMISSION SYSTEMS

[75] Inventor: Thomas Oswald, Dartford, United Kingdom

[73] Assignee: STC plc, London, England

[21] Appl. No.: 783,570

[22] Filed: Oct. 3, 1985

[30] Foreign Application Priority Data

Oct. 5, 1984 [GB] United Kingdom ............... 8425232

[51] Int. Cl.$^4$ .......................... H04B 9/00; H04L 1/22
[52] U.S. Cl. ...................................... 455/601; 370/16; 455/8
[58] Field of Search ...................... 455/8, 9, 10, 14, 17, 455/133, 134, 135, 137, 601; 178/70 R, 70 B; 179/170 R, 175.35; 371/8, 11, 68; 370/16; 340/825.01; 379/338

[56] References Cited

U.S. PATENT DOCUMENTS

| | | | |
|---|---|---|---|
| 3,020,398 | 2/1962 | Hyde | 455/46 |
| 3,035,169 | 5/1962 | Griffith | 455/10 |
| 3,866,121 | 2/1975 | Nakamura et al. | 455/10 |
| 4,435,704 | 3/1984 | Hashimoto et al. | 340/825.01 |
| 4,581,770 | 4/1986 | Haworth | 455/601 |

Primary Examiner—Benedict V. Safourek
Attorney, Agent, or Firm—Kerkam, Stowell, Kondracki & Clarke

[57] ABSTRACT

In an optical transmission system, particularly a submerged system, a line finding system is provided which, in the event of a fault somewhere along the system, enables the remaining operative lines or paths to take over the traffic and thus "steer around" the fault. The laser sources of the submerged repeaters and switched by electrical selection at their input using failed clock or a supervisory signal to achieve the switching.

6 Claims, 4 Drawing Figures

OPTICAL TRANSMISSION SYSTEMS

This invention relates to optical transmission systems, particularly but not exclusively submerged optical transmission systems.

In an optical transmission system, there is normally provided more than one optical transmission path. This enables an increase in overall transmission capacity and it also provides protection against a failure in the transmission path of for example a laser source at a repeater located somewhere along the transmission path. That is to say although one transmission path may be lost to traffic, the remaining transmission paths will still be operative.

Prior art specification GB No. 2060875 deals with reliability and proposes a redundancy system in which a normally redundant receiver-transmitter pair can be automatically switched into service in a fibre optic transmission system to replace a normally operative pair if a fault is detected. Thus transmission can still be accomplished despite the fault. However, it deals with a situation in which any one of several incoming fibres can be switched to any one of several outgoing fibres by using any selected one of several regenerators. Thus the arrangement is extremely inefficient since each working fibre/regenerator/fibre requires at least one other similar arrangement as a back up.

It is an object of the present invention to provide an arrangement which is cost effective yet enables faults to be overcome to provide high reliability.

According to the present invention there is provided an optical repeater comprising at least two separate input and output paths (A, B) and two optical output sources (LA1, LA2) associated with each input path (A), characterised in that the sources (LA1, LA2) associated with a common input path (A) are associated with different respective output paths (A, B), and wherein selection means are provided for selecting operation of a particular optical output source by switching the source input whereby transmission from an input path can be transferred to a different output path.

Figure 2:
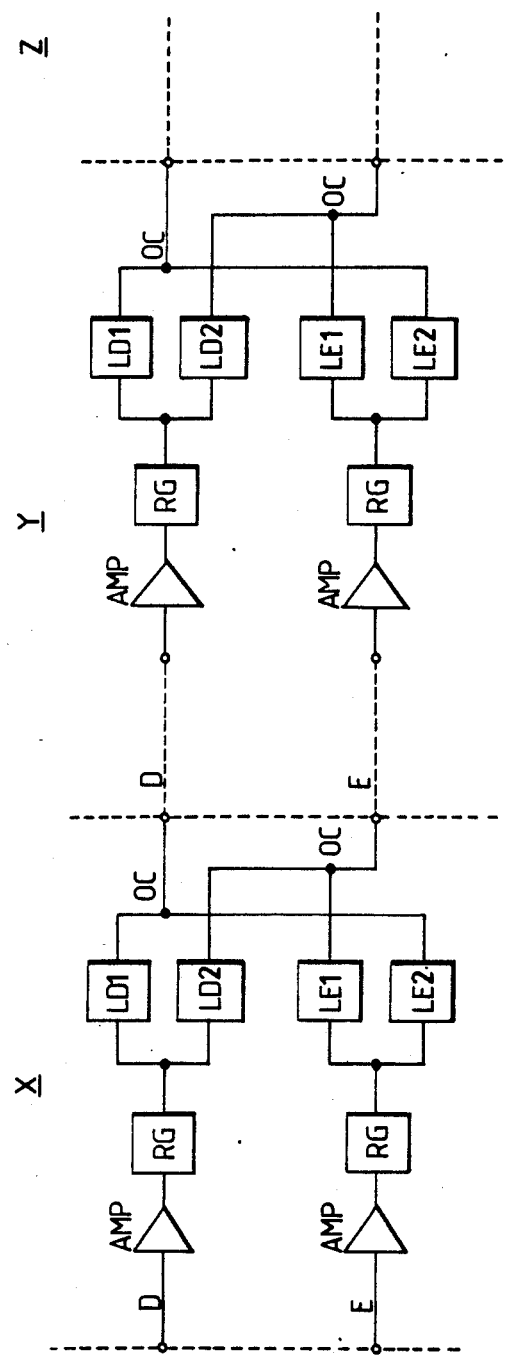
Figure 2A:
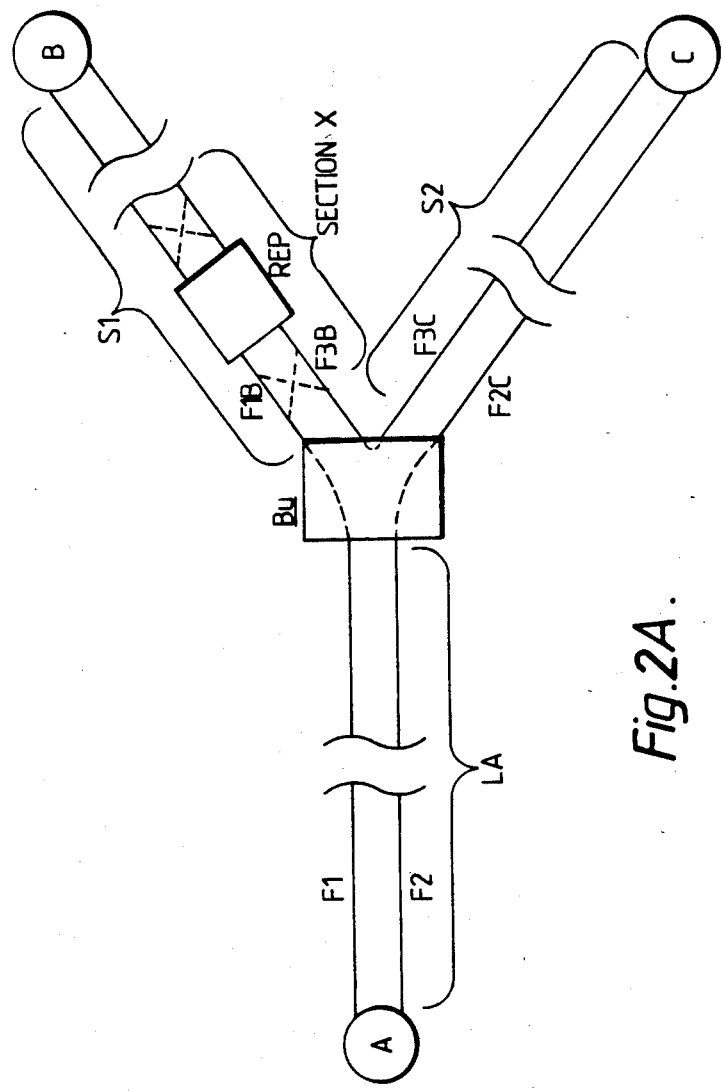

In order that the invention can be clearly understood reference will now be made to the accompanying drawing in which:

FIGS. 1 and 1A show schematically part of a submerged optical transmission system according to an embodiment of the invention, and FIGS. 2, 2A show the invention applied to spurs feeding a main leg of a system according to another embodiment.

Referring to the drawing the submerged optical transmission system comprises three transmission paths A, B and C. Three adjacent sections of the transmission system are designated generally by the reference numerals 11, 12 and 13, and each section includes a length of optical fibre cable or cables carrying and protecting three optical fibres, one for each of the transmission paths A, B and C. These could each be say 40 kilometres long. Each section also includes a repeater and only that part of the repeater which is essential for an understanding of the present invention is shown schematically in the drawing. This part comprises, for each optical fibre, an amplifier AMP, a regenerator RG for regenerating the digital signal, and a pair of lasers LA1 and LA2.

The output of each laser is combined with the output of another laser in an optical combiner OC, of which there are three, one for each fibre A, B and C of the next section 12.

Section 12 has the same arrangement as section 11 and likewise section 13 would have the same arrangement as section 11 and section 12.

The same plan would be provided for transmission in the opposite direction along the route.

The initial operation arrangement is for lasers LA1, LB1 and LC1 to be operating while lasers LA2, LB2 and LC2 would remain idle.

One can regard the system shown as a two fibre system in which the third fibre is canabilised to maintain two traffic streams in the event of multiple failures or as a three fibre system which loses one third of its capacity in the event of one or more failures. In either case all three traffic streams are available initially. If a laser fails, for example, if laser LA1 of section 11 fails, then laser LA2 is switched on LB2 is switched on and laser LC2 is switched on so that the fibres of section 11 are connected to the fibres of section 12 in the following manner: A to B, B to C, and C to A. In this way three transmissic'n paths are maintained open.

As can be seen if one fibre or its subsequent apparatus fails, the laser switching facility can be used to route a regenerator to an operative fibre. The method requires a means to render both lasers in a repeater inoperative if they give out spurious signals, for example, steady light or unintelligble data.

In normal operation, there is a clock signal (FIG. 1A) which is used to retime the impulses at the regenerator. The clock output is a sine wave signal at the bit rate. The amplitude of this can be made to provide a DC signal. Failure of this signal could be used to disable both lasers in a regenerator through an inhibition circuit familiar to those versed in the art. It is necessary to disable lasers giving out spurious signals because we wish to use the fibres to which they are connected for "good" signals from other lasers. One cause of spurious signals is when the laser drive circuits are driven by noise signals due to a preceding failed fibre, or whatever-or there is no input to the lasers so that they give out CW.

The inhibition circuit can te given a long time constant, compared with a word, so that ordinarily it can do nothing. If clock is present, but the lasers give a useless output (high error rate or just rubbish) then the lasers can be switched off by a signal applied to their mean power controller (which supplies them with electrical power). In one embodiment the supervisory system uses phase modulation of the clock (the repeaters have a low-Q clock filter), with various codes to produce several commands to perform several supervisory functions: an extra code is used to operate a circuit switching off the lasers via lines L1 and L2. It is necessary to back this up by the circuit of the previous paragraph since if there were no clock there could be no command signal.

Alternatively with a supervisory system with repeaters which will not support clock phase modulation, the controlled insertion of errors can be used as a signalling method. Assuming the clock amplitude is reasonable, random errors will not inhibit the supervisory command system. Again, an extra command can be used to switch off the lasers.

The system described retains the feature of maintenance of traffic, if only one laser fails in a repeater e.g.

if LA1 fails, LA1, LB1 and LC1 are replaced by LA2, LB2 and LC2.

Considering again the system set up with all three traffic streams in operation and with lasers LA1, LB1 and LC1 in operation. If fibre 11A fails (or the apparatus in repeater 11A fails) then laser LA1 of section 11 and laser LA2 of section 11 either become or are commanded to be inoperative, so that one traffic stream is lost (12A and beyond).

Suppose subsequently that fibre 12B (or the apparatus in repeater 12B) fails, then laser LB1 of section 11 is replaced by laser LB2 of section 11 by command from one end of the system. Laser LC1 of section 11 is replaced by laser LC2 of section 11, and then fibres 12A and 12C carry the two traffic streams. Laser LB1 of section 12 and laser LB2 of section 12 are both inoperative now off because the clock signal has failed when the repeater input was removed.

Suppose now that fibre 13A (or the apparatus in repeater 13A) fails, and it is required to re-route traffic onto leg 13B, the laser LA1 of section 12 is replaced by laser LA2 of section 12 (lasers LB1 and LB2, both of section 12, remain inoperative).

We have thus bypassed an inoperative repeater section.

Thus the present invention provides a line finding method in which if a fibre or regenerator fails, another route onward can be found. It is true that if only one fibre fails then two out of three paths are still working whatever one does. However, if no line finding facility were provided, if a further fibre fails in the two erstwhile working fibres, only one fibre is left. A further failure in one of the two fibres gives a 50% chance of no system. With the line finding facility, a failed fibre/regenerator can be by-passed, if necessary back to the original fibre/regenerator disposition, so that one can "steer around" the faults in the manner described typically with the sequence of events described above.

FIGS. 2, 2A show the invention applied to a two-fibre system having short spurs S1, S2 to a long leg LA of the system, such as that illustrated in FIG. 2A. In FIG. 2A a submerged transmission system extending from a station A has a main leg LA extending to a branching unit BU. From there one of the fibres F1 of the main leg is connected to fibre F1B for the traffic between station A and Station B, and the other of the two fibres F2 is connected to fibre F2C for traffic between Station A and Station C. Traffic between Station B and Station C travels via a third path provided by fibre F3B and F3C via the branching unit BU.

It is proposed that at least some of the repeaters in the spurs are as shown in FIG. 2, so that failure of fibre F1B carrying long distance traffic can be transferred to fibre F3B at the expense of local or short distance traffic.

FIG. 2 shows two repeatered section x, y in the spur S1, similar to e.g. sections 11 and 12 in FIG. 1, and including similar amplifiers AMP, regenerators RG and lasers LD1, LD2, LE1, LE2, similar to LA1, LA2. Their outputs are combined in optical combiner OC for the two optical fibres D and E. Section Y is similar to section X.

The same plan would be provided for transmission in the opposite direction.

The initial operational arrangement is for lasers LD1, LE1, to be operating while lasers LD2, LE2 are idle. A fault occuring in the spur can be guided around in the same way as described for FIG. 1. However, the supervisory procedure adopted at e.g. Station B allows a common address from the two fibre paths D, E, and an automatic clock failure method to switch off unwanted lasers, is not necessary: a laser can be commanded to switch off from a remaining "operative" fibre path. In particular where only two fibre paths are used (as illustrated in FIGS. 2, 2A) the common supervisory address enables the lasers to be changed over since with one path failed, there is an innocuous place for a poor signal to go: then a "both switch off" facility is not necessary.

The repeaters described do not need to be incorporated at each repeatered section and it would be possible to have "conventional" repeaters i.e. ones without the switching facility, interspersed with those according to the present invention, dependent upon the degree of reliability required of the system.

I claim:

1. An optical repeater comprising at least two separate input and two separate optical fibre paths and two optical output sources coupled with each input path, wherein the sources coupled with each input path are permanently optically coupled with different respective output paths, and a supervisory system operatively connected to said sources is provided for selecting operation of a particular optical source by switching the source whereby transmission from an input path can be transferred to a different output path.

2. A repeater as claimed in claim 1, comprising three said input and output optical fibre paths.

3. A repeater as claimed in claim 1 wherein each output path is fed by an optical power combiner connected to receive the output signals from the sources coupled with said different respective input paths.

4. A repeater as claimed in claim 1, wherein the supervisory system for selecting operation of a particular optical output source comprises means responsive to failure of the clock signal for the repeater for a predetermined period to disable one or more optical sources associated with a particular input path.

5. An optical transmission system extending from a terminal station and comprising at least one repeater as claimed in claim 1 and a supervisory system at said terminal station for selecting operation of the optical output sources.

6. An optical repeater for an optical transmission system in which information can be transmitted along first and second optical fibre paths, said repeater comprising a first regenerator coupled to receive and regenerate the signals in said first path; a second regenerator coupled to receive and regenerate the signals in said second path, two first optical output sources coupled to the output of said first regenerator, two further optical output sources coupled to the output of said second regenerator, a first optical power combiner coupled to one of said first and one of said further optical output sources and haing an output for coupling regenerated signals to the first path, a second optical power combiner coupled to the other of said first and the other of said second optical output sources and having an output for coupling regenerated signals to the second path.

* * * * *

UNITED STATES PATENT AND TRADEMARK OFFICE
CERTIFICATE OF CORRECTION

PATENT NO. : 4,696,060
DATED : September 22, 1987
INVENTOR(S) : Thomas Oswald

It is certified that error appears in the above-identified patent and that said Letters Patent is hereby corrected as shown below:

Claims:
Column 4, line 23, after "separate" insert --output--.
Column 4, line 25, after "path" insert --, wherein the sources compled with each input path--.
Column 4, line 29, after "optical" insert --output--.
Column 4, line 60, delete "haing" insert --having--.

Signed and Sealed this

Tenth Day of May, 1988

Attest:

DONALD J. QUIGG

Attesting Officer

Commissioner of Patents and Trademarks